United States Patent
Raffa et al.

(10) Patent No.: US 8,447,609 B2
(45) Date of Patent: May 21, 2013

(54) ADJUSTMENT OF TEMPORAL ACOUSTICAL CHARACTERISTICS

(75) Inventors: Giuseppe Raffa, Beaverton, OR (US); Lama Nachman, Santa Clara, CA (US); David L. Graumann, Portland, OR (US); Michael E. Deisher, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 894 days.

(21) Appl. No.: 12/347,977

(22) Filed: Dec. 31, 2008

(65) Prior Publication Data

US 2010/0169075 A1 Jul. 1, 2010

(51) Int. Cl.
*G10L 13/00* (2006.01)
*G10L 13/08* (2006.01)

(52) U.S. Cl.
USPC ............... 704/260; 704/9; 704/258; 704/267

(58) Field of Classification Search
USPC .................................... 704/9, 258, 260, 267
See application file for complete search history.

(56) References Cited

U.S. PATENT DOCUMENTS

| | | | | |
|---|---|---|---|---|
| 4,624,012 A | * | 11/1986 | Lin et al. | 704/261 |
| 4,700,393 A | * | 10/1987 | Masuzawa et al. | 704/503 |
| 4,817,161 A | * | 3/1989 | Kaneko | 704/267 |
| 5,189,702 A | * | 2/1993 | Sakurai et al. | 704/266 |
| 5,386,493 A | * | 1/1995 | Degen et al. | 704/267 |
| 5,396,577 A | * | 3/1995 | Oikawa et al. | 704/260 |
| 6,205,420 B1 | * | 3/2001 | Takagi et al. | 704/211 |
| 6,490,553 B2 | * | 12/2002 | Van Thong et al. | 704/211 |
| 6,934,680 B2 | * | 8/2005 | Holzapfel | 704/245 |
| 7,240,005 B2 | * | 7/2007 | Chihara | 704/267 |
| 2001/0023399 A1 | * | 9/2001 | Matsumoto et al. | 704/262 |
| 2004/0044516 A1 | * | 3/2004 | Kennewick et al. | 704/5 |

OTHER PUBLICATIONS

Zhao, et al., "earPod: Eyes-free Menu Selection using Touch Input and Reactive Audio Feedback", Proceedings of the Conference on Human Factors in Computing Systems (CHI 2007), San Jose, California, USA, Apr. 28-May 3, 2007, 10 pages.

Arons, Barry "SpeechSkimmer: A System for Interactively Skimming Recorded Speech", ACM Transactions on Computer-Human Interaction, vol. 4, No. 1, Mar. 1997, pp. 3-38.

Blattner, et al., "Earcons and Icons: Their Structure and Common Design Principles", Human-Computer Interaction, vol. 4, 1989, pp. 11-44.

(Continued)

*Primary Examiner* — Talivaldis Ivars Smits
*Assistant Examiner* — Shaun Roberts
(74) *Attorney, Agent, or Firm* — Schubert Law Group PLLC

(57) ABSTRACT

Embodiments may be a standalone module or part of mobile devices, desktop computers, servers, stereo systems, or any other systems that might benefit from condensed audio presentations of item structures such as lists or tables. Embodiments may comprise logic such as hardware and/or code to adjust the temporal characteristics of items comprising words. The items maybe included in a structure such as a text listing or table, an audio listing or table, or a combination thereof, or may be individual words or phrases. For instance, embodiments may comprise a keyword extractor to extract keywords from the items and an abbreviations generator to generate abbreviations based upon the keywords. Further embodiments may comprise a text-to-speech generator to generate audible items based upon the abbreviations to render to a user while traversing the item structure.

26 Claims, 6 Drawing Sheets

OTHER PUBLICATIONS

Lemmens, et al., "Effects of Auditory Icons and Earcons on Visual Categorization: The Bigger Picture", Proceedings of the 2001 International Conference on Auditory Display, Espoo, Finland, Jul. 29-Aug. 1, 2001, pp. 117-125.

Brewster, et al., "Multimodal 'Eyes-Free' Interaction Techniques for Wearable Devices", CHI 2003, Ft. Lauderdale, Florida, USA., Apr. 5-10, 2003, 8 pages.

Cardie, Claire "Empirical Methods in Information Extraction", AI Magazine vol. 18, No. 4, 1997, pp. 65-79.

Burnett, et al., "Speech Synthesis Markup Language (SSML) Version 1.0", W3C Recommendation, Sep. 7, 2004, 39 pages.

Klatt, Dennis H., "Software for a cascade/parallel formant synthesizer", J. Acoust. Soc. Am. vol. 67 No. 3, Mar. 1980, pp. 971-995.

Manning, et al., "Foundations of Statistical Natural Language Processing", 2000, 704 pages.

Malah, David, "Time-Domain Algorithms for Harmonic Bandwidth Reduction and Time Scaling of Speech Signals" IEEE Transactions on Acoustics, Speech, and Signal Processing, vol. ASSP-27, No. 2, Apr. 1979, pp. 121-133.

Amir, et al., "Using Audio Time Scale Modification for Video Browsing" Proceedings of the 33rd Hawaii International Conference on System Sciences, 2000, pp. 1-10.

Fonix Corporation., "DECtalk ® Software" Reference Guide 4.6.3 Beta Documentation, Dec. 2004, 190 pages.

Hanson, et al., "Development Of Rules For Controlling The Hlsyn Speech Synthesizer", 1999, pp. 85-88.

* cited by examiner

FIG. 3B

| RENDERED SOUND 310 | PL 312 | PLST 314 | PLAYLIST 316 | ACCESS YOUR PLAYLIST 318 |
|---|---|---|---|---|
| LIST NAVIGATION INTERFACE 320 | 4X SPEED 322 | 3X SPEED 324 | 2X SPEED 326 | 1X SPEED 328 |
| CELL INTERFACE 330 | TIME SPENT HOVERING OVER CELL 332 → | | | |

300

ADJUSTMENT OF TEMPORAL ACOUSTICAL CHARACTERISTICS

FIELD

The present disclosure relates generally to audible rendering technologies. More particularly, the present disclosure relates to the adjustment of the temporal characteristics of an item structure such as a list of items, to control the time with which an item may be aurally presented.

BACKGROUND

A mobile device such as a cellular phone, handheld device, handheld computer, "Palmtop", Mobile Internet Devices (MIDs) or the like is typically a pocket-sized computing device having a user interface such as a display screen with touch input or a miniature or micro keyboard. Many personal digital assistants (PDAs) integrate the inputs and outputs with a touch-screen interface.

Mobile devices such as Smartphones, PDAs, and Enterprise digital assistants (EDAs) are popular tools for those whom require the assistance and convenience of a conventional computer in environments where carrying one would not be practical. EDAs offer functionality for the business user such as integrated data capture devices like Bar Code, Radio Frequency Identification (RFID) and Smart Card readers. As is the case with many PDAs, EDAs may also include a Touch Screen, an Infrared Data Association (IrDA), Bluetooth®, and a Memory card slot.

As mobile devices become more capable in processing, communication and storage, new applications are emerging to take advantage of these capabilities and the inherent mobility of these devices. Mobility, however, imposes several constraints on the types of interaction users of mobile devices can be involved in. It is increasingly common for users to use of the device capabilities (calendar, contacts, email, location based services, . . . ) when a visual interaction is inappropriate. Examples of such situations are situations in which the user is physically active (walking, running, driving); the device is not reachable (e.g.: in the purse or pocket); the screen is too small for a quick interaction; or the user is engaged in demanding activities or at least visually demanding activities.

As a consequence, seamless eyes-free interactions should be developed that address all the tasks that are commonly performed by users while interacting with their devices. One of these common tasks is based on the selection of one or several items in a list. For example, lists of commands to be conveyed to the device, contacts, to-do list, appointments and the like.

One way of implementing an eyes-free interaction for the "List Selection" task is based on the utilization of an "Audible List" (meaning that all the list items are played back sequentially to the user). In such an interaction, the sequential nature of an Audible List limits its efficiency, increasing the time utilized to traverse the list, as opposed to the direct access nature of a visual list.

BRIEF DESCRIPTION OF THE DRAWINGS

FIG. 3B illustrates audio transformations generated in response to two different audible user interface controllers;

DETAILED DESCRIPTION OF EMBODIMENTS

Figure 1:
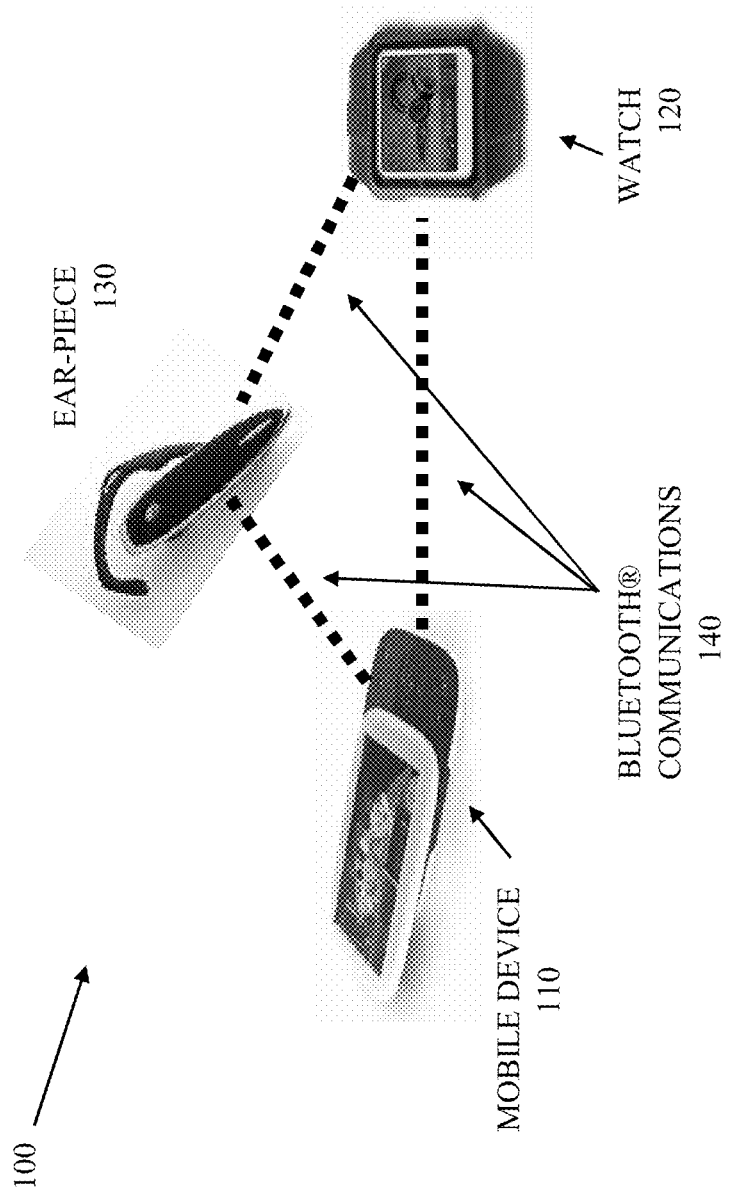
FIG. 1 depicts an embodiment of a system including a mobile device, a watch, and an earpiece.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Generally, adjustment of temporal acoustical characteristics of words to be played back to the user is described herein. Embodiments may be a standalone module or part of mobile devices, desktop computers, servers, stereo systems, or any other systems that might benefit from condensed audio presentations of item structures such as lists or tables. Embodiments may comprise logic such as hardware and/or code to adjust the temporal characteristics of items comprising words. The items maybe included in a structure such as a text listing or table, an audio listing or table, or a combination thereof, or may be individual words or phrases. Note that embodiments also condense words and phrases in other formats but, for clarity and ease of discussion, this specification often discusses words and phrases in a list format. For instance, some embodiments may adjust temporal characteristics of an audio stream that is generated when traversing the list with controls such as forward reverse fast forward fast reverse, pause. The characteristics of the audio stream may be modified in a way that the meaning is still comprehensible: each item can be discriminated from the others while the time consumption in traversing the list is shortened. For example, the audio playback speeds up, 'briefs', or condenses the list content when fast forward.

Many embodiments condense item structures of items that represent words via a keyword extractor and an abbreviations generator. The keyword extractor may extract keywords from each of the items and the abbreviations generator may abbreviate the keywords. The selection of keywords may involve identifying words that are not keywords and/or identifying words that are keywords to create a keyword item structure of keyword items. The selection of keywords may involve identifying as not being keywords, words that are repeated in multiple items in the item structure; add little or no meaning to the item such as prepositions and articles; are related to a user context such as the user's name, address, city or state; are typically not comprehended by the user; are of word classes such as noun or verb; are not relevant or not comprehensible or distinguishable by the user; or the like. The selection of key words may also involve identifying as keywords, words that are unique to a particular item, words that are of word classes such as noun or verb, relevant based upon the context of the item structure, typically comprehended or distinguishable by the user, or the like.

The abbreviations generator may abbreviate the keywords of each item by accessing an audio knowledge base that provides information about pronunciation and grammar for words and phrases that may help identify phonemes, identify phonemes that are generally associated with a key word, identify phonemes that are typically understood by a particular user, identify syllables that are emphasized in a individual words or phrases, identify syllables that are generally understood, identify syllables that are typically understood by a particular user, or the like. In many embodiments, the audio knowledge base comprises audio recordings and the abbreviations generator may access the audio knowledge base to retrieve the stored audio recordings to build the abbreviations of the keywords with the pre-recorded sounds. The audio recordings may comprise, for example, recordings of phones, phonemes, accented syllables, stressed syllables, accented phonemes, stressed phonemes, phonemes and syllables with intonations, words with intonations, phrases with intonations, or the like. In such embodiments, for instance, these abbreviations of the keywords may be suitable audio for output via an output mechanism such as a speaker.

Furthermore, many embodiments comprise an input device to receive an indication of a number of speeds that will be available to a user for traversing the item structure of the items via an audible user interface controller. In some embodiments, speed parameters may indicate the desired speeds. In some embodiments, user preferences may indicate particular speeds or levels of abbreviation that the user prefers for navigation. In such embodiments, the abbreviations generator may generate abbreviated items for each speed. The different speeds can be achieved by varying the extent of the abbreviations. In further embodiments, the keyword extractor may also produce different levels of keyword extraction so the number of speeds can be expanded further. For example, a first level of keyword extraction may involve identifying keywords totaling approximately six syllables per item and a second level of keyword extraction may involve identifying keywords totaling approximately three syllables per item.

While some of the specific embodiments described below will reference the embodiments with specific configurations and lists, those of skill in the art will realize that embodiments of the present disclosure may advantageously be implemented with other configurations with similar issues or problems as well as data in other formats such as tables, streams of words or phrases, or simply words or phrases rather than a list of words or phrases.

Turning now to FIG. 1, there is shown an embodiment of a system 100. System 100 comprises a mobile device 110, a watch 120, and an earpiece 130. The mobile device 110 in this embodiment is a mobile Internet device (MID) and cellular phone. The mobile device 110 may contain, or provide access to, an item structure such as a list through which a user will traverse. For instance, the cellular phone may comprise a contact list or phone book stored locally. Access to the menu system, preferences, email, text messages, etc., may also be accessible in an item structure such as a table with access to a sub-table and/or sub-list via selection of a cell or item in the table. Furthermore, the cellular phone may have access to the Internet or other wireless networks, allowing the user to access a number of remote item structures.

The mobile device 110 may comprise or have access to content in an item structure and, in the present embodiment, the user may interact with the mobile device 110 remotely, allowing the mobile device 110 to remain in the pocket, purse, or bag, or even at a remote location such as at an office or at home. Remote communication may be accomplished via wireless communication formats. Wireless embodiments may integrate low power wireless communications like Bluetooth®, wireless local area networks (WLANs), wireless metropolitan area networks (WMANs), wireless personal area networks (WPAN), cellular networks, and/or Institute of Electrical and Electronic Engineers (IEEE) standard 802.15.4 communications in the mobile device, watch, and earpiece. The standard, IEEE 802.15.4™, "Wireless Medium Access Control (MAC) and Physical Layer (PHY) Specifications for Low Rate Wireless Personal Area Networks (LR-WPANs)" (2006) (http://standards.ieee.org/getieee802/download/802.15.4-2006.pdf), provides for low-data-rate connectivity among relatively simple devices that consume minimal power and typically connect at distances of 10 meters (30 feet) or less. IEEE 802.15.4™, addresses fixed, portable and moving devices that operate at data rates of 10 to 250 kbps. The standard allows devices to form short-range ad hoc networks within which they can interact directly.

Furthermore, some wireless embodiments may incorporate a single antenna while other embodiments may employ multiple antennas. For instance, multiple-input and multiple-output (MIMO) is the use of multiple antennas at both the transmitter and receiver to improve communication performance. MIMO technology offers significant increases in data throughput and link range without additional bandwidth or transmit power. It achieves this by higher spectral efficiency (more bits per second per hertz of bandwidth) and link reliability or diversity (reduced fading).

In some embodiments, the item structure may be in an audible format. In other embodiments, the item structure may comprise text and the mobile device 110 may translate the items in the item structure into abbreviated items comprising audible items or indicators via, e.g., text-to-speech conversion logic, or the like. In further embodiments, the abbreviated items may be stored in an audible item structure for access by an audible user interface controller. In such embodiments, the abbreviated items may be converted to speech as the user traverses the audible item structure. In other embodiments, the abbreviated items may comprise a compilation of audio recordings such as recordings of phones, phonemes, accented syllables, stressed syllables, accented phonemes, stressed phonemes, phonemes and syllables with intonations, words with intonations, phrases with intonations, or the like. In many embodiments, the abbreviated items may be suitable audio for output via an output mechanism such as a speaker of earpiece 130.

Mobile device 110 may receive the item structure as an input and search for keywords in each input item. For instance, a keyword extractor may search for redundant words and begin creating a keyword item structure based upon the input item structure with the keywords extracted from each input item. For embodiments in which input items are received in an audio format, searching for keywords may comprise searching for phonemes and comparing the phonemes to phonemes of words, comparing audio of the input items to a database or library of stored audio for keywords or words that are not likely relevant to the understanding or comprehension of the input item, or translating the audio content to text via speech recognition logic. For embodiments that receive text items as input items, the words of input items may be compared against text in a database such as a text mining database.

If only one item is to be condensed, the audible item structure generator may create a keyword item by extracting the redundant words within the input item. In the context of a single input item, keywords are words that are generally likely to help the user to distinguish the input item from other items such as nouns and verbs. On the other hand, if a structure of multiple input items is to be condensed, the audible item structure generator may search for redundant words throughout the input item structure, or at least to the extent that the input item structure is available, to find redundant words because redundant words may not be significant for a user's ability to distinguish input items in the structure from other input items in the structure.

Mobile device 110 may also extract keywords through other processes such as by searching for unique words in the structure; words that are generally comprehended by users; words that are within certain word classes such as nouns, verbs, articles, prepositions, adverbs, adjectives, conjunctions, or the like; to find keywords, which are words for this input item structure that are likely to help the user distinguish input items from one another.

Mobile device 110 may then abbreviate the keywords by substituting phonemes for the words in each keyword item based upon the pronunciation of the keywords. Mobile device 110 may include an audio knowledge base that provides information related to the pronunciation and grammar. In some embodiments, the audio knowledge base includes a number of different combinations of phonemes to substitute for words. These different combinations may include different combinations of phonemes that users generally recognize as the word. Some of the different combinations of phonemes for particular words may take differing amounts of time to sound (assuming a constant sounding rate or pronunciation speed) and some of the different combinations for the particular word may take the same amount of time to sound. For example, the word "embodiment" may take 800 milliseconds (ms) without abbreviation. A first level of abbreviation may include phonemes that reduce or condense the normal speed pronunciation of "embodiment" to, e.g., 400 ms, a second level of abbreviation may condense the normal speed pronunciation of "embodiment" to, e.g., 200 ms, and a third level of abbreviation may condense the pronunciation of "embodiment" to, e.g., 30 ms, at normal speed. The audio knowledge base may include two different abbreviations for "embodiment" at the first level of abbreviation, three different abbreviations at the second level, and one abbreviation at the third level. The inclusion of multiple abbreviations at a particular level of abbreviation may allow a user to select a preferred abbreviation or may allow the audible item structure generator to learn which variation of abbreviation is more often or likely comprehended by the user using a metric such as task completion.

Text-to-Speech logic of mobile device 110 may generate audible items for each of the abbreviated items for the input item structure. The audible items may then be stored in memory such as a cache to facilitate fast access to the audible items. When a user traverses the an item in the item structure at a particular speed, the mobile device 110 may transmit the audible item for a particular input item at a particular level of abbreviation based upon the navigation speed with which the user traverses the input item. The earpiece 130 may then sound the audible item in response to receipt of the audible item from the mobile device 110 to provide the user with an indication of the item being traversed.

In other embodiments, mobile device 110 may not comprise the Text-to-Speech logic. For instance, the abbreviations generator may generate abbreviated items that are audible items by building the abbreviated items from audio recordings.

The watch 120 may measure physical movement by a user to determine the direction and speed of traversal of the input item structure. In the present embodiment, the watch 120 comprises a built-in motion sensor such as three dimensional (3-D) accelerometer or a gyroscopic sensor to monitor movement so the movement can be translated into navigation through the one or more input items in an input item structure.

As the user traverses the input item structure, mobile device 110 may transmit audible items corresponding to the input items being traversed for the navigation speed indicated by the user.

The earpiece 130 will play back audible items to the user to help the user navigate the item structure to an item of interest. Reaching the item of interest may be the goal in some instances because the earpiece may play an audible item for the item. In other instances, selecting the item may allow the user to enter into a sub-structure of items. For example, a list may comprise names and phone numbers from contact information stored in the mobile device 110. Upon reaching the name of interest (after traversing the list of names abbreviated at different speeds), the full name and phone number of the item of interest may be communicated to the user. In further embodiments, once the user navigates to the item of interest, he/she can use either a button on the watch to select the item, executing a function related to the item such as entering a sub-list or playing audio content associated with the selected item, or, in this example, call the stored phone number.

Figure 2:
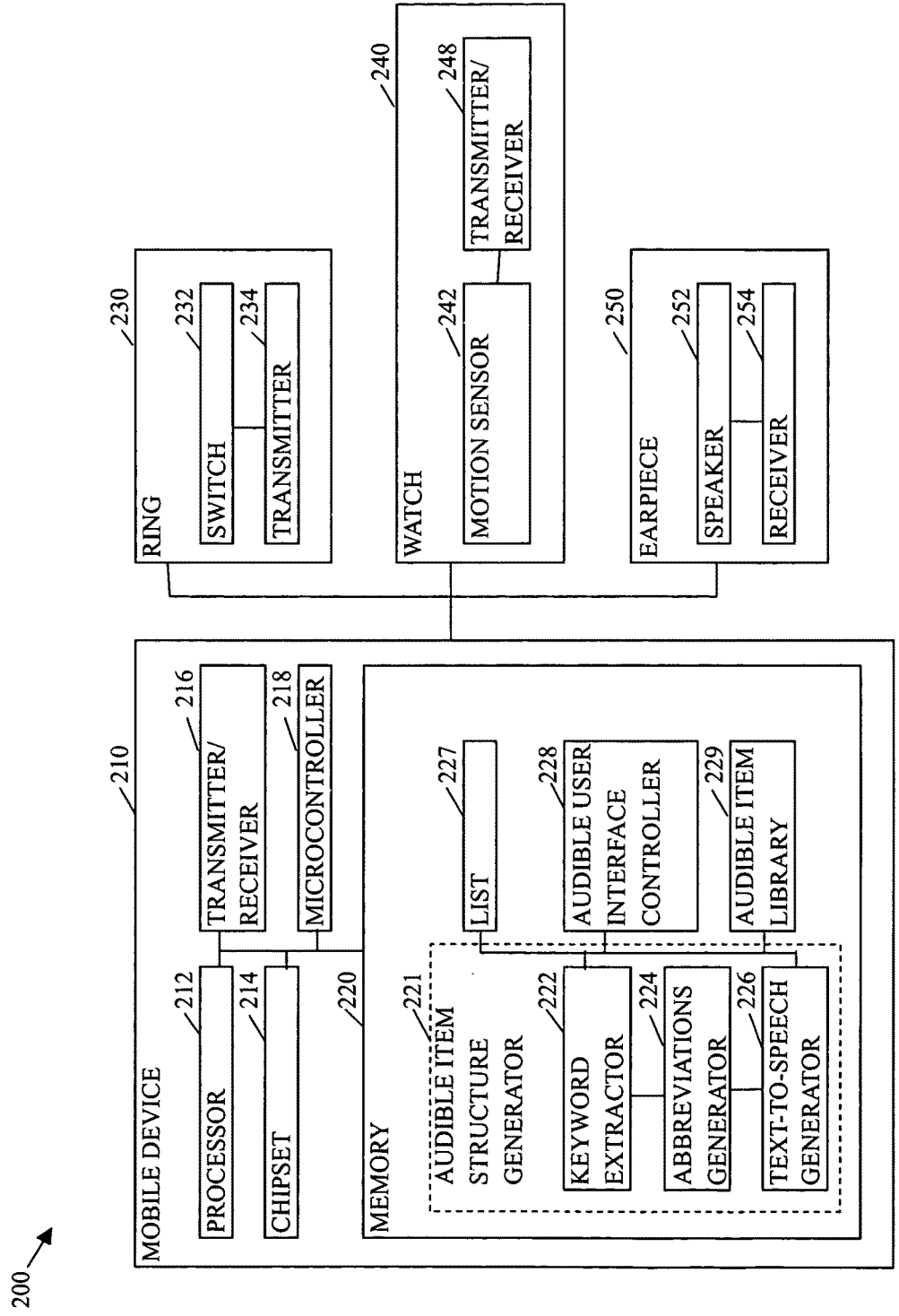
FIG. 2 depicts an embodiment of a system including a mobile device, a watch, a ring, and an earpiece.

FIG. 2 depicts a system 200 to traverse a list 227 to execute a selected list item. System 200 may comprise a mobile device 210, a ring 230, a watch 240, and an earpiece 250. The mobile device 210 may comprise a Nettop, a Netbook, a cellular phone, a personal data assistant (PDA), a laptop, or the like. In other embodiments, functionality of system 200 may be integrated into non-mobile or less than mobile devices such as desktop computers, game consoles, servers, and the like. The mobile device 210 may provide access to one or more lists and may communicatively couple with the watch 240 and the earpiece 250 and with the ring 230 via the watch 240. For example, the mobile device 210 may comprise navigation code as well as a global positioning system and map data to offer routing information to a user. The mobile device 210 may comprise a list 227 of destinations in memory 220 and the user may access the list 227 of destinations via an audible mapping of the list 227 in the form of audible items stored in an audio library such as audible item library 229. And, the user may access the list 227 via the mobile device 210 by moving the watch to traverse the list 227 and select an item from the list 227 by changing the state of the switch 232 on the ring 230. The watch 240 may transmit the data related to movement of the watch 240 directly to the mobile device 210 and the ring 230 may transmit a signal related to the state of the switch 232 to the watch 240, which may relay the signal or data representative of the signal to the mobile device 210. In other embodiments, the mobile device 210 may also communicatively couple with the ring 230 directly rather than through an interface of the watch 240.

The mobile device 210 may comprise a processor 212, a chipset 214, a transmitter/receiver 216, a microcontroller 218, and the memory 220. The processor 212 may receive and execute code such as an audible user interface controller 228 via the chipset 214. The processor 212 may comprise, for instance, one or more Intel® Atom™ processors and the chipset 214 may comprise, for instance, an Intel® 945GC Express Chipset or a Mobile Intel® 945GSE Express Chipset. In other embodiments, the microcontroller 218 may execute the code of the audible user interface controller 228.

The chipset 214 may comprise a system controller hub to coordinate communications between the processor 212 and the memory 220, the transmitter/receiver 216, and potentially other devices such as a display, a Peripheral Component Interconnect (PCI) bus, a Universal Serial Bus (USB), a network bus, or the like. For example, the chipset 214 may receive communications from the watch 240 including data from a motion sensor 242 and the transmitter/receiver 248.

The chipset 214 may also transmit communications from processor 212 to the watch 240 and the earpiece 250.

In the present embodiment, the chipset 214 may retrieve instructions and data from memory 220 in response to requests from the processor 212 to execute the audible user interface controller 228. The instructions and data may comprise logic to interpret motion data from motion sensor 242 and data regarding the state of switch 232. The instructions and data may also comprise logic to select audible items from the audible item library 229 based upon the list 227 to transmit to the earpiece 250 to sound the audible items via a speaker 252. For example, the audible user interface controller 228 may facilitate navigation by a user through an audio mapping of the list 227. The audible user interface controller 228 may comprise instructions, which, when executed by the processor 212, cause the processor to select from a number of audible items such as WAVE format (.wav) files in the audible item library 229 to transmit to the earpiece 250 to indicate the current list item. WAV (or WAVE), short for Waveform audio format, is a standard, audio file format for storing an uncompressed audio bitstream on in data storage.

The audible user interface controller 228 may also select from a number of different audible items for different positions within the list 227 based upon the speed at which the user indicates to traverse the list. For instance, the audible user interface controller 228 may facilitate modification of the navigation speed while traversing through the list 227 and, thus, select audible items from audible item library 229 associated with more condensed abbreviations if the speed is increased or less condensed abbreviations if the speed is decreased.

The transmitter/receiver 216 may comprise a wireless communications circuit for communicating with the watch 240 and the earpiece 250. In the present embodiment, the mobile device 210 receives communications from the ring 230 via the transmitter 234 and the transmitter/receiver 248 of the watch 240 to minimize the distance of the transmission to conserve power expended by transmitter 234. In other embodiments, transmitter 234 may be coupled with the watch 240 via a physical communications medium or may couple with transmitter/receiver 216 directly via a wireless or wired communications medium.

The transmitter/receiver 216 may also communicate with other devices that are not shown such as a wireless router to provide access for mobile device 210 to other local area networks, wide area networks, or the like. In one embodiment, for instance, transmitter/receiver 216 may comprise an Ethernet adapter to couple with a Ethernet network and a USB adapter to couple with a computer system, an external storage device, a peripheral, or other such devices.

Microcontroller 218 may be a specific purpose device adapted to accelerate one or more functions related to the audible item structure generator 221. In particular, microcontroller 218 may process code and data in lieu of transmitting the code and data to processor 212, which may have additional processing duties that are not directly related to the audible item structure generator 221. For example, in some embodiments, microcontroller 218 may extract keywords from list items of list 227, determine abbreviations for keyword items created by keyword extractor 222, generate audible items associated with abbreviated items from abbreviations generator 224, store audible items in audible library 229, associate audible items in audible item library 229 with items of list 227, or the like. The functionality performed by the microcontroller 218 varies between embodiments from the execution of a single function of the audible item structure generator 221 to the execution of all functions related to the audible item structure generator 221. In other embodiments, the processor 212 may perform the functionality of the audible item structure generator 221. In further embodiments, a state machine may perform the functionality of the audible item structure generator 221 and, in still further embodiments, the functionality of the audible item structure generator 221 may be in a device other than mobile device 210 but may be communicatively coupled with mobile device 210 to facilitate traversal of the list 227 via audible user interface controller 228.

The memory 220 may store code and data for execution by the processor 212, one or more lists such as list 227, as well as audible items in the audible item library 229. The memory 220 may comprise one or more different types of data storage including random access memory, read only memory, flash memory, a magnetic storage medium such as a hard drive, an optical storage medium such as a compact disk drive, a digital video disk medium, or the like.

In the present embodiment, the memory 220 comprises at least the audible item structure generator 221, the audible user interface controller 228, and the audible item library 229. The audible user interface controller 228 provides a user interface for accessing lists such as the list 227. The audible user interface controller 228 may be initiated upon powering up the mobile device 210 or upon selection of the audible user interface controller 228 by the user. In some embodiments, the audible user interface controller 228 may be initiated upon identification of devices such as the watch 240 or identification of the motion sensor 242 whether or not included within the watch 240.

The audible item structure generator 221 may receive items from the list 227, generate one or more audible items based upon the list 227, and store the audible items in audible item library 229 for usage by audible user interface controller 228. In many embodiments, the audible items are stored in a structure similar to that of the original item structure such as a list like the list 227. In other embodiments, the audible item structure generator 221 may associate audible items in audio item library 229 with list items in list 227. In some embodiments, such associations may be stored in the audible item library 229 or in list 227. In such embodiments, the audible user interface controller 228 may determine the associations between the audible items and the list items to determine the next item in the list to traverse in response to movements of the watch 240.

The audible item structure generator 221 may comprise a keyword extractor 222, an abbreviations generator 224, and a text-to-speech generator 226. In some embodiments, the audible structure generator 221 does not include a text-to-speech generator 226. In such embodiments, the abbreviated items may be stored and then sounded by another device such as a text-to-speech generator module within the mobile device 210 or communicatively coupled with the mobile device 210 such as a text-to-speech accessory.

The keyword extractor 222 may generate keyword items based upon each list item of list 227 by identifying keywords in each of the list items. For instance, keyword extractor 222 may search the list 227 to identify keywords such as nouns, verbs, and words unique to a particular item in the list 227. The keyword extractor 222 may create a keyword item that includes only the keywords for each item. In one embodiment, the keyword extractor 222 may select the first noun or first verb of each item in the list 227 to create the keyword items. The keyword extractor 222 may then transmit the keyword items to the abbreviations generator 224.

The abbreviations generator 224 may create one or more abbreviation items for each keyword item. In some embodiments, the abbreviations generator 224 may also generate a phonetic version of the full list item so the text-to-speech generator 226 may create an audible item for the full list item and the earpiece 250 may sound the entire item to the user to represent a normal or 1× speed. In other embodiments, the text-to-speech generator 226 may create at least one audible item from each list item rather than from a keyword item or an abbreviated item to represent a 1× speed.

In several embodiments the abbreviations generator 224 transmits the keyword items or abbreviated version of the keyword items to a letter-to-phoneme (LTP) preprocessor within the text-to-speech generator 226. The LTP preprocessor generates the phonetic versions of the keyword items and outputs the phonetic versions to the abbreviations generator 224. The phonetic versions of the keyword items may comprise stress markings that can be used by the abbreviations generator 224 to identify words, syllables, phonemes, and other phonetics that may be removed from the abbreviated item. The abbreviations generator 224 may then generate the abbreviated items. The abbreviations generator 224 may generate the abbreviated items as pronunciations, or phonetics, and transmit them back to the text-to-speech generator 226 to generate audible items. Or, in some embodiments, the abbreviations generator 224 may generate abbreviated items that are audible items by combining audio recordings to generate the abbreviated items.

In other embodiments, the abbreviations generator 224 may generate abbreviated items that are audible items or the like by generating the abbreviated items from a library of audio recordings, which may include pre-recorded audio clips of phonemes, syllables, words, phrases, or some combination thereof including variations with accents, intonations, stresses, or the like. Some of these embodiments, do not use or comprise text-to-speech logic such as the text-to-speech generator 226.

In some embodiments, the abbreviations generator 224 may store the abbreviated items in the audible item library 229 to await access by the audible user interface controller 228 and then the text-to-speech generator 226 may sound the abbreviated items as accessed by the audible user interface controller 228. In other embodiments, the abbreviation generator 224 transmits the abbreviations to the text-to-speech generator 226 to translate the abbreviated items into audible items by the text-to-speech generator 226 for storage in the audible item library 229 prior to access of the same by the audible user interface controller 228.

The audible user interface controller 228 may start by selecting an audible item for a current list item within the list 227. The current list item may be identified by storing a flag or pointer in memory 220. The user may then traverse the list 227 by tilting the watch 240. While traversing the list 227, the audible user interface controller 228 may generate audible items indicative the speed and direction of traversal of the list 227. The audible user interface controller 228 may generate the audible items by selecting audible items that are associated with list items being traversed from the audible item library 229 and transmitting the audible items to the earpiece 250 to sound the audible items in the user's ear.

The audible user interface controller 228 may also select an item in the list 227 upon receipt of a selection signal from a switch 232 of the ring 230. For instance, as the audible user interface controller 228 generates audible items by transmitting the audible items to the earpiece 250 to be sounded, the user may press a button on the ring 230 to indicate selection of the current list item. In some embodiments, the audible user interface controller 228 may select the item that is flagged as the current list item.

The list 227 may comprise any data or information that may be traversed. For example, the list 227 may comprise a list of songs, radio stations, phone numbers, contacts, web sites, etc. The list 227 may even comprise a list of functions for the mobile device 210 such as opening contacts, opening text messages, opening email, opening a web browser, entering a menu of preferences, or the like. In the present embodiment, the list 227 may comprise textual items and each item in the list 227 may be associated with one or more audible items in the audible item library 229 via the audible item structure generator 221. For example, if list 227 comprises a menu from which the user may choose different functions of the mobile device 210. Each menu item may be associated with a unique audible item such as a sound clip. Accessing a calling feature of the mobile device 210 may involve selecting a list item that is identified by an audible item that sounds like "place call" such as "plās kȯl" at 1× speed, "plā kȯ" at 2× speed, or "p k" at 3× speed. In further embodiments, the audible user interface controller 228 may comprise a text-to-speech conversion logic so that speech may be generated on-the-fly for lists that a user may want to navigate.

The ring 230 may offer a convenient and intuitive way to "grab" the item in the list 227 to select or execute that item. For instance, a button may be located at the bottom of the ring 230 and upon reaching an item of interest in the list 227, the user may touch the button with the user's thumb to activate the switch 232, offering the user a natural movement typically related to grabbing an object. In other embodiments, the switch 232 may be located on a different device such as earpiece 250 that is communicatively coupled with the mobile device 210.

The ring 230 may also comprise wireless communications capabilities via transmitter 234 such as a Bluetooth® transmitter. The ring 230 may maintain the switch 232 in a convenient location for a user to activate or actuate the switch 232. In the present embodiment, the ring 230 is wirelessly connected with the watch 240. Upon changing the state of the switch 232, the transmitter 234 may transmit the selection signal to the watch 240 and the watch 240 may transmit the selection signal to the mobile device 210.

The watch 240 may offer any of a variety of watch functions. In the present embodiment, the watch 240 comprises the motion sensor 242 and the transmitter/receiver 248. In some embodiments, the watch 240 transmits raw motion data to the mobile device 210. In the present embodiment, the watch 240 may process the motion data to produce navigation data prior to transmitting the navigation data to the mobile device 210. The watch 240 may comprise a motion sensor such as one or more tilt switches, a gyroscopic sensor, a, 3-D accelerometer, or other sensor capable of monitoring motion of the watch 240.

The earpiece 250 may be any type of earpiece or headset that can sound the audible items to the user. The earpiece 250 comprises the speaker 252 and a receiver 254. The speaker 252 producers the sounds and the receiver 254 may receive an audible item and transmit the signal to the speaker 252 in an appropriate format. For example, if the receiver 254 is coupled with the mobile device 210 via a physical medium, the receiver 254 may comprise a pre-amplifier or impedance matching circuitry. In other embodiments, the receiver 254 may comprise a wireless receiver to receive the audible items as wireless signals. In further embodiments, the receiver 254 may comprise a digital receiver, either wired or wireless, and may comprise logic to convert the digital signal to an analog signal that may be sounded by the speaker 252.

Figure 3A:
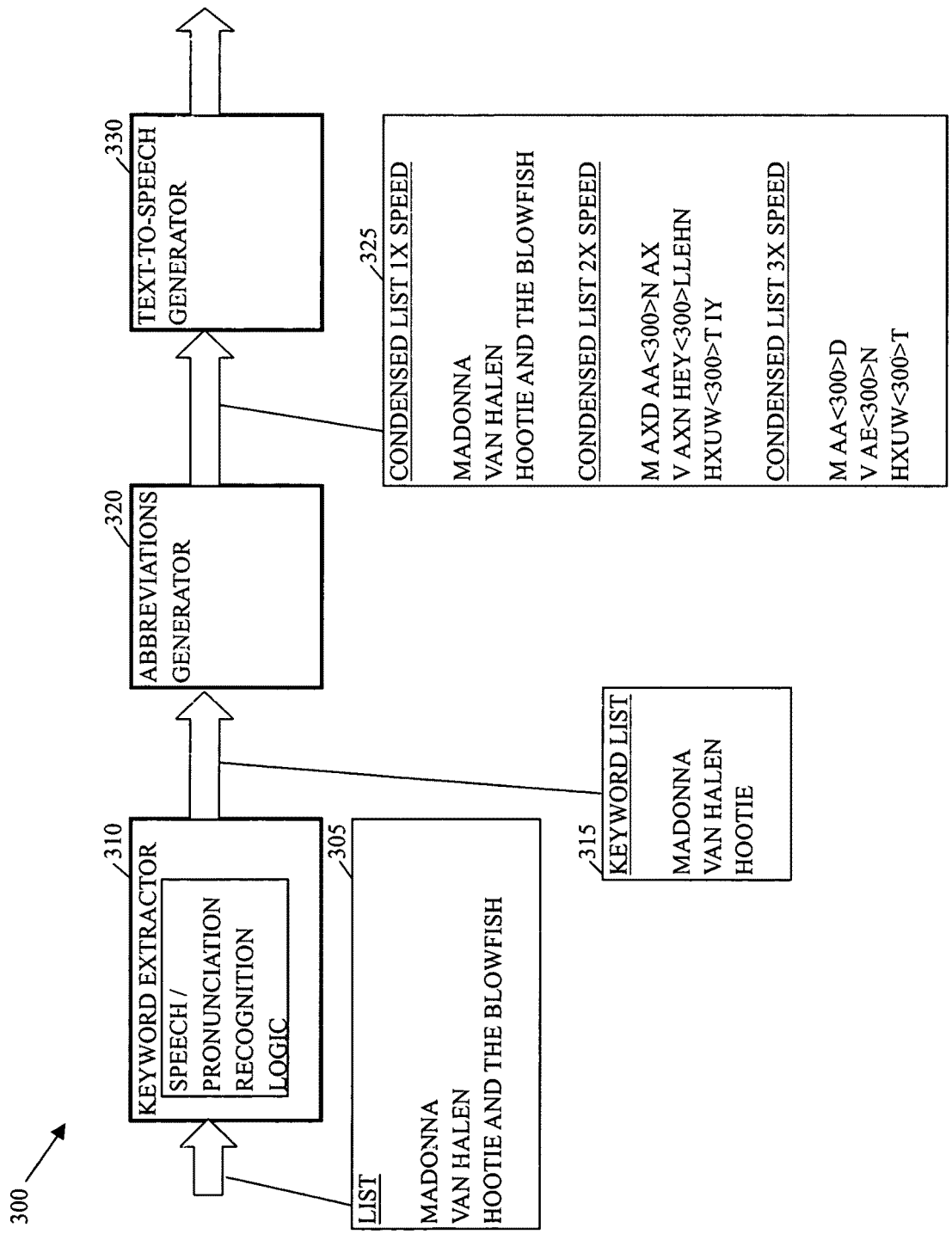
FIG. 3A illustrates creation of an audible item structure comprising a three item list via an audible item structure generator.

FIG. 3A illustrates creation of an audible list of a three item list via an audible item structure generator 300. The audible item structure generator 300 comprises a keyword extractor 310 with speech/pronunciation recognition logic, an abbreviations generator 320 and a text-to-speech generator 330. In the present embodiment, the keyword extractor 310 receives a list 305 comprising "Madonna", "Van Halen", and "Hootie and the Blowfish". The keyword extractor 310 also comprises a speech/pronunciation recognition logic to recognize words or to compare audio against pronunciations of words in item structures that are provided as audio content rather than as text.

The keyword extractor 310 extracts keywords from the list 305 to generate a keyword list 315. The keyword list 315 includes "Madonna", "Van Halen", and "Hootie". In the present embodiment, the keyword extractor 310 determines that the single word item "Madonna" should remain as the keyword in the first item. With regards to the second item. the keyword extractor 310 may determine that "Van Halen" may be a proper name, may determine that at least two syllables of the list item should be included in the keyword item as a minimum rule, may determine that at least two syllables of the list item should be included in the keyword item based upon the three syllables in the keyword of the first item, may determine that "Van Halen" is more comprehensible phrase to the user than "Van" or "Halen" based upon prior task completions, may determine that "Van" is an article that provides little meaning by itself, may determine that "Van Halen" is generally more comprehensible as a phrase than as individual words, or other criteria.

In many embodiments, more than one criterion may factor into the decision to select "Van Halen" over "Van" or "Halen" alone. In some of these embodiments, the number of factors that select "Van Halen" may determine to the resulting keyword item. In other embodiments, some factors may have more weight than other factors. For instance, factors related to the specific user or to general comprehension may carry more weight than other factors. In some of these embodiments, the determination results from a calculation of weighted factors and the keyword selection is associated with the greatest calculated result. In other embodiments, keyword extractor 310 may, for instance, select "Halen" as the keyword and remove "Van" from the keyword item because "Van" an article in some languages.

In further embodiments, the results of the keyword extraction may differ between navigations speeds. The navigation speeds are associated with the speed with which a user can traverse an item due to the speed with which the item may be sounded. For instance, keyword extractor 310 may generate "Van Halen" for a first navigation speed and "Van" and "Halen" as two alternative keyword items for a second navigation speed.

With regards to "Hootie and the Blowfish", the keyword extractor 310 may extract "Hootie" as the first unique noun in the list item based upon the content of the list, may determine that "Hootie" is the first unique word with at least two syllables, may determine that "Hootie" has a high comprehensibility rating generally and/or specifically with the user, may determine that "Hootie" is a relevant word for comprehension of "Hootie and the Blowfish" based upon prior experience with the user, and/or the like.

The abbreviations generator 320 may receive the keyword list 315 either as a file or one keyword item at a time. In some embodiments, the abbreviations generator 320 may receive the keyword list 315 in the order in which the keyword extractor 310 creates keyword items for the list. In many embodiments, the abbreviations generator 320 may review the content of multiple keyword items to determine an abbreviation for a keyword so the abbreviations generator 320 may generate consistent abbreviations for the same keyword in different items. In other embodiments, the abbreviations generator 320 may determine abbreviations for each keyword or each keyword item without regard to other keywords within the item or within other items in the keyword list 315.

In the present embodiment, the abbreviations generator 320 may generate three condensed lists 325 based upon the keyword list 315. In particular, the abbreviations generator 320 may receive an indication from an audible user interface controller to generate abbreviations for thee different navigation speeds such as 1×, 2×, and 3×. 1× may represent a pronunciation of a full list item. For instance, at 1× speed, the abbreviations generator 320 may pass through the entire items from list 305, i.e., "Madonna", "Van Halen", and "Hootie and the Blowfish", without keyword extraction or abbreviations. In other embodiments, 1× speed may include keyword extraction and/or abbreviation. In some embodiments, for example, the abbreviations generator 320 may at least generate a phonetic spelling of each of the list items to facilitate text-to-speech conversion by the text-to-speech generator 330.

The abbreviations generator 320 may generate abbreviations by looking up abbreviations in a table of abbreviations in an audio knowledge base, determining abbreviations via pronunciation logic, determining abbreviations via a table that associates abbreviations with general comprehension of keywords, determining abbreviations via a table that associates abbreviations with comprehension by a user, determining abbreviations looking up common abbreviations for a keyword in a table, determining abbreviations that remove less emphasized syllables in the word or phrase, or the like.

The abbreviations generator 320 may generate a condensed list 2× speed comprising "M AXD AA<300>N AX", "V AXN HEY<300>LLEHN", and "HXUW<300>T IY" as well as a condensed list 3× speed comprising "M AA<300>D", "V AE<300>N", HXUW<300>T". The abbreviations generator 320 may select shorter abbreviations to represent faster speeds and longer abbreviations to represent slower speeds.

In some embodiments, phonetic instructions may be included within the abbreviations such as "<300>" and such instructions may affect the duration of pronunciation of syllables or phonemes for the abbreviation. In the present embodiment, the text-to-speech generator 330 may interpret the "<300>" to represent a duration of the preceding phoneme such as a duration of 300 ms or may represent a multiplicative factor used to modify the duration such as three times the default duration. In other embodiments, "<300>" may represent a pause, an accent, or the other phonetic parameter.

FIG. 3B illustrates audio transformations generated in response to two different audible user interface controllers for system 300 illustrated in FIG. 3A. In the present embodiment, the item is condensed in isolation from or without regard to other items. The item comprises that phrase "Access your Playlist" 318.

Row 310 describes the sound rendered to the user based upon navigation via a list navigation interface 320 and a cell interface 330. For example, the list navigation interface 320 may offer a user an ability to advance through a list either forward or backwards at four different rates of speed, i.e., 1× Speed 328, 2× Speed 326, 3× Speed 324, and 4× Speed 322. In the present embodiment, if the user selects the 1× Speed 328, the list navigation interface 320 may select and transmit to an audio output mechanism, an audible item that represents a rendering of the entire text of an item in an item structure such as "Access your Playlist" 318. At 2× Speed 326, the keyword extractor 310 may have removed "Access your" to, e.g., select the first noun, so the list navigation interface 320 may render "Playlist" 316. At 3× Speed 324, the abbreviations generator 320 may reduce the keyword item "Playlist" 316 to "PLST" 314. And, at 4× Speed 322, the abbreviations generator 320 may reduce the keyword item "Playlist" 316 to "PL" 312.

The cell interface 330 may be an interface in which the user may traverse through "virtual" cells in a visual or auditory mapping of items in a list, a menu, a table, or the like, to cells. The cell interface 330 may allow a user to hear the item within a cell based upon the amount of time that a user spends hovering over the cell 332. In the present embodiment, four different navigation speeds are available so the cell interface 330 may select and transmit to an audio output mechanism, an audible item that represents a rendering of "PL" 312 in case the user decides to quickly traverse the cell. Until the user decides to move to another cell (i.e., while the user continues to hover over this cell), the cell interface 330 may continue to render in order "PLST" 314, "Playlist" 316, and "Access your Playlist" 318. For instance, the user may continue to hover until the user comprehends the content of the cell.

Figure 4:
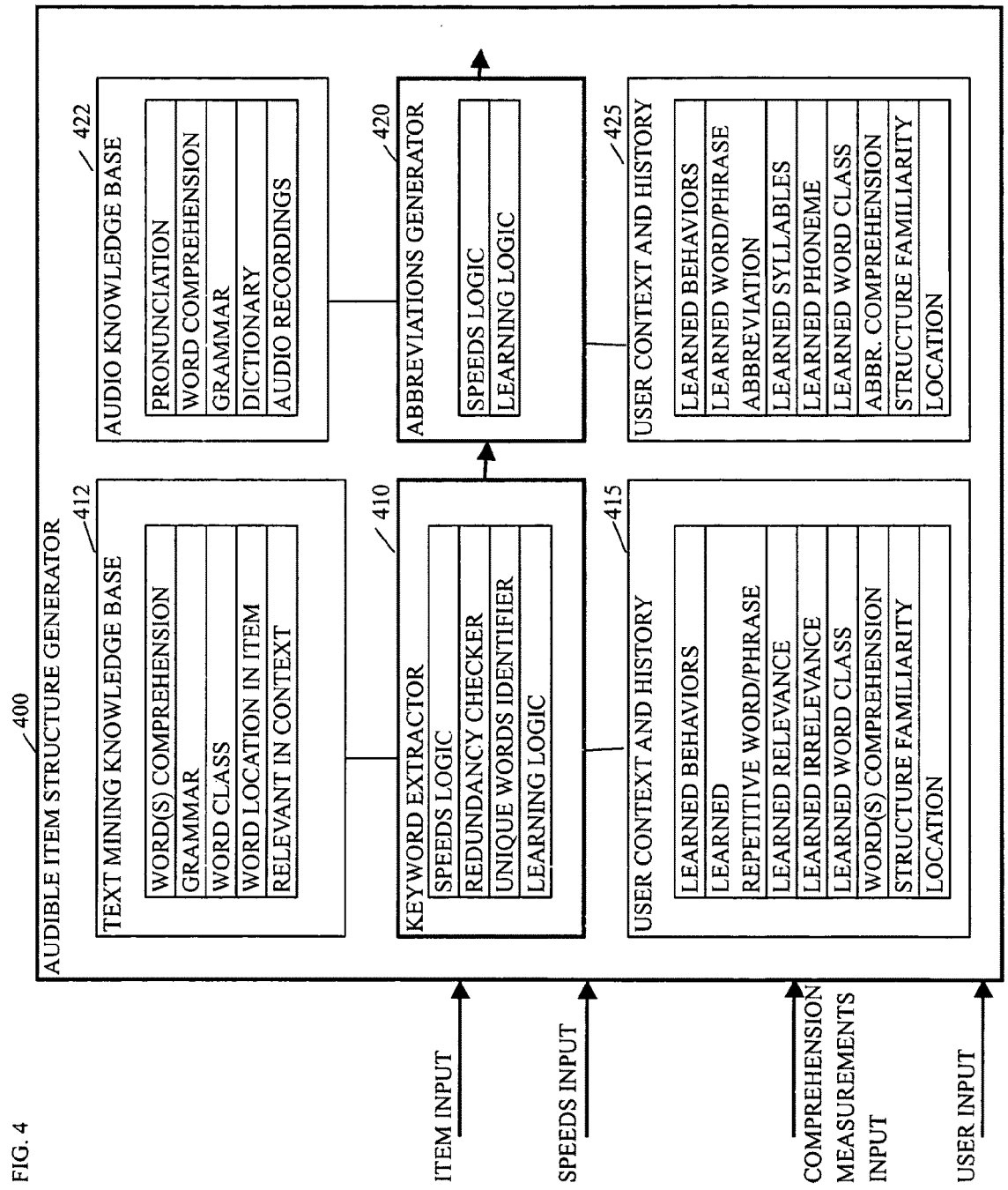
FIG. 4 depicts an embodiment of an apparatus for adjustment of temporal acoustical characteristics of items representing words.

FIG. 4 depicts an embodiment of an apparatus, an audible item structure generator 400, for adjustment of temporal acoustical characteristics of items representing words. The audible item structure generator 400 may receive four inputs including an item input to receive input items or a structure of input items, a speeds input to receive an indication of a number of navigation speeds for which the audible item structure generator 400 should create abbreviations, a comprehension measurements input to provide feedback to the audible item structure generator 400 about successful usage of keyword combinations and abbreviations, and a user input to receive information related to one or more users of the audible item structure generator 400 for discerning keywords and abbreviations. The audible item structure generator 400 may generate a number of items including abbreviated items to store in memory for retrieval by an audible user interface controller and rendering via a text-to-speech generator. Alternatively, the audible item structure generator 400 may to transmit abbreviated items to a text-to-speech generator to produce an audible library of audio items representing each input item of the input item structure at different navigation speeds.

The audible item structure generator 400 may comprise processing logic including a keyword extractor 410 and an abbreviations generator 420 as well as databases including a text mining knowledge base 412, a user context and history 415 for keywords, an audio knowledge base 422, and a user context and history 425 for abbreviations. The keyword extractor 410 creates keyword items for each item received that may include keywords identified by the keyword extractor 410 via the text mining knowledge base 412 and the user context and history 415.

The keyword extractor 410 may include speeds logic, redundancy checker, unique words identifier, and learning logic. The speeds logic may receive an indication of the number of navigation speeds that audible item structure generator will produce and, based upon the number of speeds, determine whether to create one or more keyword items for each input item received via the items input. For example, if the abbreviations generator is designed to produce four abbreviations for four speeds in addition to a 1× Speed, and the speeds input indicates seven speeds, the keywords extractor 410 may produce two keyword items per input item.

The keyword extractor 410 may comprise the redundancy checker to search the input items to find words that are repeated both within the same item and throughout multiple items. The keyword extractor 410 may assign a value to each of the redundant words representing how often the word is repeated throughout multiple items as well as a value to each of the words indicative of the number of repetitions of the word in a single item. The values may then be weighted and used to calculate which words to identify as keywords and which words to mark as not being keywords. For example, if a word is repeated five times in a single item but not in other items, the keyword extractor 410 may assign a value of five to the word for the number of repetitions in a single item and a zero as the value for the number of repetitions in other items. Based upon the zero repetitions of the word in other items, the keyword extractor 410 may remove all but one instance of the word in the item for the 1× speed, keyword item and remove the word altogether for a 2× speed, keyword item. In many embodiments, such determinations are made after all factors related to keywords are processed.

The keyword extractor 410 may comprise the unique words identifier to identify words that are unique to each item. The unique words identifier may select and determine a value to assign to each word that occurs only once in a particular input item and/or in the entire structure of input items such as all the input items in a list. Words that are unique to a particular input item may receive a lower value than words that are only unique within each input item. Furthermore, words that only occur a few times within the input item structure may receive a higher value than those that only occur once in the structure but a lower values than those that occur in many or all of the input items in the structure.

In further embodiments, the selection of keywords is not a weighted calculation but a combination of one or more processes for narrowing the number of words identified as keywords. For example, rather than assigning weights based upon redundancy and uniqueness, the keyword extractor 410 may remove from the list of potential keywords, those words that are repeated in multiple of the input items. In some embodiments, the redundancy logic may only remove words that are repeatedly found in most of the input items.

Similarly, the unique words identifier may identify all unique words as keywords and such words may remain identified as keywords unless another process identifies them as a word to remove from the keyword list. For example, if a word in a first input item occurs only once in the structure of input items, then the word may be identified as unique and then be identified as a keyword if other processes do not identify the word as not being a keyword. However, if the user context and history database 415 indicates that a user's ability to comprehend an input item based upon the word is a very poor, then the word may be identified as not being a keyword despite the uniqueness of the word with respect to the other input items.

The keyword extractor 410 may comprise the learning logic to learn and store information related to the user from the user input as well as information related to the user's or users' comprehension of keywords. For example, the comprehension measurements input may provide data related to a user's selection of an item at various traversal speeds, cancellation of a selection a various traversal speeds, lengths of time a user hovered over an item, numbers of times a user traversed an time prior to selecting the item, numbers of time that a user reduced or increased the traversal speed over various items, and/or the like. The keyword extractor 415 may store some or all such measurements or summaries of such measurements in the user context and history 415 and determine various processes for selecting keywords based upon the user context and history 415. For example, the learning logic may determine that the user often selects an item from a list with a minimal abbreviation. Based upon this, the learning logic may store such an indication in the learned behaviors of user context and history.

To illustrate, a user with a username Joe may often select a phone number for an entry entitled "Mike Surname" based upon pronunciation of the word "Mike" because "Mike" is unique to that phone book item in a phone book list. The learning logic may determine that "Mike" should be the keyword in the phone number list every time regardless of the navigation speed selected by Joe. Thus, Joe may only hear "Mike" as the indication of the input item even if Joe selects a 1× Speed. On the other hand, if Joe enters another contact with "Mike" into the phone book list, the redundancy checker may determine that "Mike" is not redundant and eliminate the word "Mike" as a stand alone, keyword.

The learning logic of the keyword extractor 415 may also track keywords and keyword phrases that are identified amongst different item structures and store such keywords and phrases in the user context and history 415. Based upon statistics related to how often the keywords and phrases appear in other item structures, the learning logic may determine a measure of suitability for the keyword or phrase to be a standalone keyword or phrase. For example, if a keyword is identified as a keyword in multiple lists that a user traverses, the keyword may be identified as a preferred selection as a keyword in other lists or item structures.

Additional information that learning logic of keyword extractor 410 may track include learned relevance which may indicate that ability of a user to identify an input item based upon inclusion of a particular word as a keyword, learned irrelevance which may indicate a user's inability to comprehend an item based upon the pronunciation of the word, learned word class which may indicate a user's preference or ability to comprehend an item based upon the classification of a word such as a noun or a verb particularly in the same item structure, word(s) comprehension which may indicate a user's ability to comprehend particular keywords, structure familiarity which may be indicative of how often a user traverses an item structure as well as the speed with which the user traverses the structure, and location. The learning logic may learn of a user's location such as the city, state, county, and country and determine the appropriateness of the keyword based thereupon. For instance, if the user lives in Portland, Oreg. and the list that a user is traversing relates to locations in Oregon, the word "Oregon" may be identified as a word that is not a keyword. Thus, even if the word "Oregon" only occurs in one item, "Oregon" may not be selected as the keyword or at least as a standalone keyword for the item.

In several embodiments, the learning logic of the keyword extractor 415 may include tests to test a user's ability to comprehend keywords and may track the results of these tests to set populate at least part of the user context and history 415.

The text mining knowledge base 412 may provide keyword extractor 410 with more generally applicable factors for determining keywords than those of user context and history 415. In particular, the text mining knowledge base 412 may comprise information related to word(s) comprehension which may include words that potential users generally comprehend or do not generally comprehend, grammar may indicate words or rules to describe words that are not likely to help a user to distinguish items from one another, word class which may indicate via words or rules that certain word classes such as nouns and verbs are more likely to help distinguish items from other items, word location in item may indicate a likelihood that a word can distinguish an item from another item based upon how close or far a word is from the first word in the item, and relevant in context which may indicate words that are more likely capable of distinguishing items from one another in certain categories of item structures. For example, a noun may be more likely to distinguish items from one another in certain types of lists than a verb or adverb and vice versa in other types of lists.

The abbreviations generator 420 may determine abbreviations for keywords selected by the keyword extractor 410 and generate an abbreviations item for each keyword item by substituting the abbreviations for the keywords. In some embodiments, the abbreviations generator 420 determines abbreviations based upon multiple keywords or syllables or phonemes of one or more keywords for each of the keyword items. In further embodiments, the abbreviations generator 420 may select the same abbreviation for each instance of a keyword in the item structure. For example, if a keyword occurs twice in two different keyword items, the same abbreviation for the keyword may be used in both items rather than independently selecting the abbreviation for each instance of the keyword.

The abbreviations generator 420 may include speeds logic and learning logic. The speeds logic may receive an indication of the number of navigation speeds that audible item structure generator will produce and, based upon the number of speeds, determine whether to create one or more abbreviation items for each keyword item received from keyword extractor 410. For example, if the abbreviations generator 420 is designed to produce four abbreviations for four speeds in addition to a 1× Speed, and the speeds input indicates five speeds, the abbreviations generator 420 may produce five abbreviation items per keyword item.

The learning logic of the abbreviations generator 420 may learn and store information related to the user from the user input as well as information related to the user's or users' comprehension of abbreviation items. As discussed above, the comprehension measurements input may provide data related to a user's selection of an item at various traversal speeds, cancellation of a selection a various traversal speeds, lengths of time a user hovered over an item, numbers of times a user traversed an time prior to selecting the item, numbers of time that a user reduced or increased the traversal speed over various items, and/or the like. The abbreviations generator 420 may store some or all such measurements or summaries of such measurements in the user context and history 425 and determine various processes for selecting abbreviations based upon the user context and history 425. For example, the learning logic may determine that the user often selects one or more specific items from a list with a minimal abbreviation. Based upon this, the learning logic may store such an indication in the learned behaviors of user context and history.

To illustrate, a user with a username Joe may often select a phone number for an entry entitled "Michael Surname" based upon pronunciation of the vowel "M" because "M" is unique to that phone book item in the phone book list. The learning logic may determine that "M" should be the abbreviation in the phone number list every time regardless of the navigation speed selected by Joe. Thus, Joe may only hear "M" as the indication of the item for "Michael Surname" even if Joe selects a 1× Speed.

The learning logic of the abbreviations generator 420 may also track abbreviated words and phrases that are identified amongst different item structures and store such abbreviated words and phrases in the user context and history 425. Based upon statistics related to how often the abbreviated words and phrases appear in other item structures, the learning logic determines a measure of suitability for the abbreviated words and phrases to be standalone abbreviations for keyword items. For example, if a keyword item is associated with an abbreviation that is determined to be successfully comprehended by a user, the abbreviation may be identified as a preferred abbreviation for the keyword or phrase.

Additional information that learning logic of abbreviations generator 420 may track includes learned syllables which may indicate that ability,of a user to identify an input item based upon inclusion of a particular syllables included in an abbreviation, learned phonemes which may indicate a user's ability to identify an input item based upon inclusion of a particular phonemes included in an abbreviation, learned word class which may indicate a user's preference or ability to comprehend an input item based upon abbreviations for a particular classification of a word such as abbreviations for nouns or verbs particularly in the same item structure, abbreviation comprehension which may indicate a user's ability to comprehend particular abbreviations, structure familiarity which may be indicative of how often a user traverses an item structure as well as the speed with which the user traverses the structure, and location. The learning logic may learn of a user's location such as the city, state, county, and country and determine an abbreviation based thereon. For instance, if the user lives in Portland, Oreg. and the list that a user is traversing relates to cities in and around Oregon, the city of the user and potentially cities close in proximity to the user's city may be abbreviated to a greater extent than more remote cities.

In several embodiments, the learning logic of the abbreviations generator 420 may include tests to test a user's ability to comprehend abbreviations and may track the results of these tests to set populate at least part of the user context and history 425.

The audio knowledge base 422 may provide the abbreviations generator 420 with more generally applicable factors for determining abbreviations than those of user context and history 425. In particular, the audio knowledge base 412 may comprise information or data related to word and phrase pronunciation including syllables and phonemes associated with the correct pronunciation of the words and phrases, word and phrase comprehension which may include word and phrase comprehension that potential users generally comprehend or do not generally comprehend, grammar may indicate rules to describe the conventions governing the use of any given natural language, and a dictionary to provide a library of words and pronunciations, or phonetics, for those words and particularly pronunciations designed or adapted for use with a text-to-speech generator that will be used to pronounce the abbreviated items. For example, the grammar may include the morphology and syntax, phonetics, and phonology.

Morphology may describe the internal structure of words and how the words may relate to other words through rules and syntax may describe the principles and rules for constructing sentences. Thus, abbreviations generator 420 may, based upon the grammar, determine that the plural form of a word may be represented by a non-plural version of the word based upon other words in the input item.

Phonetics may describe the physical sounds of human speech and may including various expressions for the same syllables that may add stress, accent, and intonation. In many embodiments, the grammar may include a library of phonetics for different sounds and phonology rules may instruct abbreviations generator 420 regarding how to use the different sounds. In particular, phonology may describe the rules for use of sound to encode meaning in spoken language such as via syllable structure, stress, accent, and intonation. Thus, for example, the abbreviations generator 420 may, based upon the grammar, parse the syllable structure, or add stresses, accents, or intonations to provide meaning to the abbreviations that may not be represented through direct substitution of the same phonetics for the same word such as to convey surprise or irony, or to pose a question. To illustrate, the abbreviations generator 420 may parse the input item as well as the corresponding keyword item to determine that the input item formed a question. As a result, the abbreviations generator 420 may add an intonation or emphasis to imply a question with the keyword abbreviations in the abbreviated item.

As another illustration, the abbreviations generator 420 may parse the textual representation of a list input, and shorten the text to, e.g., a minimal format. Several methods may be used to obtain such result:

Analyzing the entire content of the list and find repeated words and/or words with no salient information (e.g. traversing the list of restaurants in the same location, delete ZIP code and location name).

Analyzing user context (e.g. location for a selection of restaurant) and previous history collected from the system (e.g: frequent places, home town, static preferences) to delete unnecessary information.

Utilizing Natural Language Processing algorithms to summarize text and detect salient keywords. Two of such methods may include:

Statistical methods based on analysis of a text-corpus;

Rule-based methods based on part-of-speech.

If the latter is used, for example, the first noun can be chosen.

Alternatively, the speech synthesizer can be used to determine which word(s) is/are important by observing where it naturally places the stress when rendering the original phrase.

Furthermore, the abbreviations generator 420 may perform this for list item and for each speed. The abbreviations generator 420 may a use the audio knowledge base 422 comprised of a Dictionary that contains words, their phonetic representation and pronunciation rules. For example, stressed syllables can be maintained integrally while non-stressed syllables can be compressed in time or even deleted according to the playback speed. The output abbreviated item may be described by a phonetic grammar that a text-to-speech generator is able to parse.

In some embodiments, the audio knowledge base 422 may comprises audio recordings and the abbreviations generator 420 may access the audio knowledge base 422 to retrieve the stored audio recordings. For example, the audio knowledge base 422 may comprise recordings of phone, phonemes, stressed syllables, word pronunciations, phrase pronunciations, or the like, including pronunciations with accents and intonations.

Figure 5:
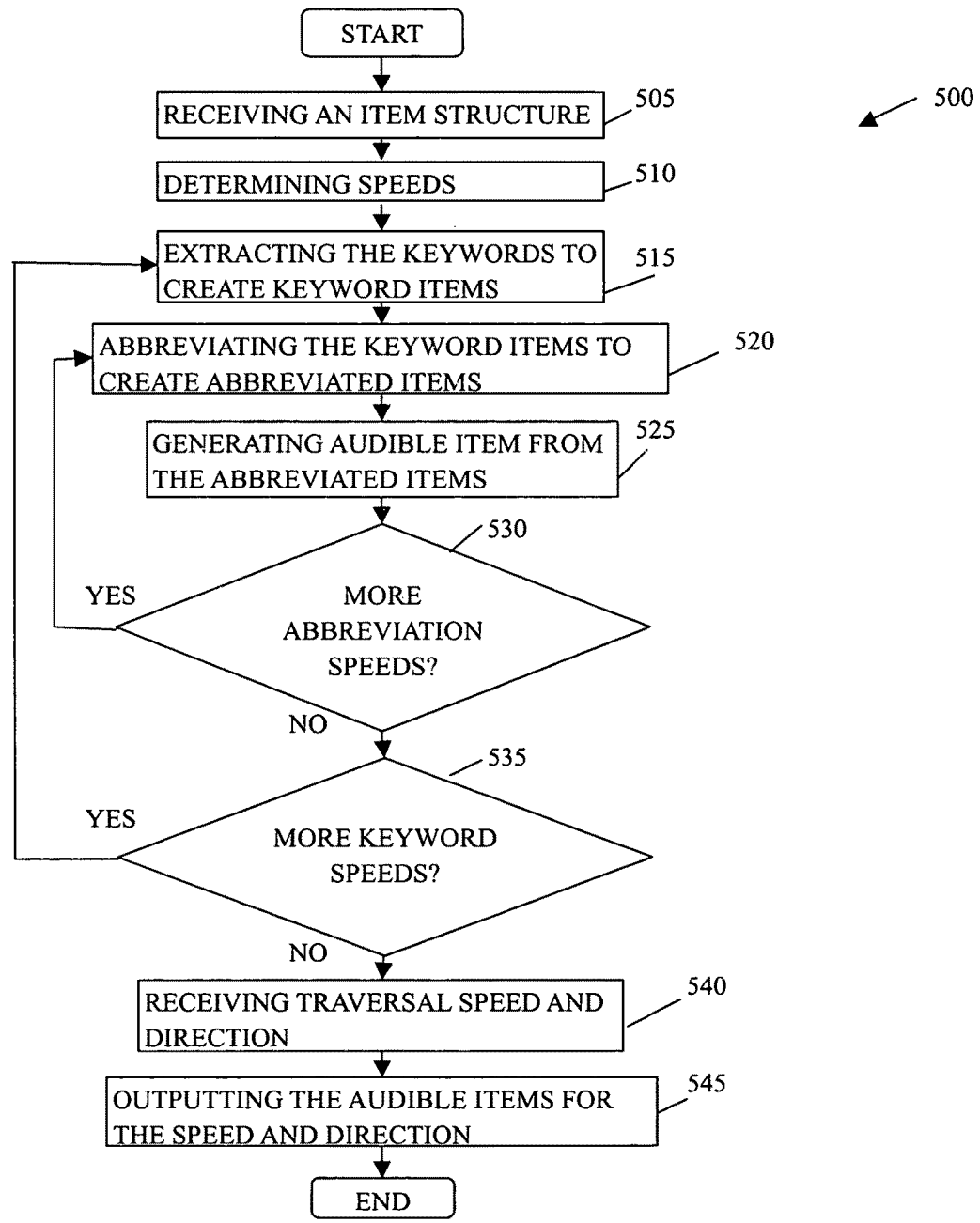
FIG. 5 illustrates a flow chart of an embodiment for adjustment of temporal acoustical characteristics of items representing words.

FIG. 5 illustrates a flow chart 500 of an embodiment for adjustment of temporal acoustical characteristics of items representing words. The flow chart 500 may describe processes of operation of a system such as system 200 in FIG. 2. The flow chart 500 begins with an audible item structure generator receiving an item structure (element 505). The item structure may include items associated by a structure such as a list structure, a table structure, or the like. For example, the system may include an item structure in memory and the audible user interface controller may, in response to an indication from a user, transmit the list to the audible item structure generator or provide the audible item structure generator with a pointer to or location for the item structure. The item structure may comprise a table of cells, wherein each cell represents a menu item and execution of the cell may traverse into a list or another table.

The audible user interface controller may also provide an indication to the audible item structure generator regarding a number of navigation speeds for traversal of an audible item structure that the audible item structure generator should create. The audible item structure generator may, in response, determine the number of speeds for which to generate abbreviated items (element 510). In some embodiments, if the audible user interface controller resides in the same mobile device as the audible item structure generator, the audible item structure generator may receive the speeds indication upon initial use of the audible item structure generator or whenever the parameter changes.

After receipt of some or all of the input item structure, the audible item structure generator may begin extracting keywords from the input items to create keyword items (element 515). In particular, the keyword extractor may create one keyword item for each input item in the input item structure.

An abbreviations generator may generate abbreviated items based upon the keyword items received from the keyword item extractor (element 520). In some embodiments, the abbreviated items may be stored as an audible item structure in memory to await access and text-to-speech conversion by an audible user interface controller. In the present embodiment, a text-to-speech generator generates audible items from the abbreviated items (element 525) for storage in a cache of the audible user interface controller to facilitate quick access to the audible items for rendering to the user.

In several embodiments, the abbreviations generator couples with the text-to-speech generator, or engine, to generate a phonetic version of the keyword items to identify stress placement within a text-to-speech conversion of the input items, to abbreviate the phonetic version based upon the stress placement to create an abbreviated phonetic version, and to generate a text-to-speech conversion of the abbreviated phonetic version to represent at least one of the speeds.

If the speeds input indicates that the abbreviations generator should generate a number of levels of abbreviations to facilitate navigation speeds based upon each keyword item, the flow chart returns to element 520 to create additional abbreviated items (element 530). If not, the flow chart 500 proceeds to determine whether the speed input indicates that more keyword items should be created based upon the input items to facilitate additional speeds (element 535). If so, the flow chart returns to element 515.

Once each of the abbreviated items is created for each of the speeds indicated by the speeds input and the audible items are stored in memory, the user may traverse the item structure via the audible user interface controller. For instance, the user may traverse through a number of items by providing a speed and direction of traversal (element 540) and, as the user traverses through the audible item structure, the audible user interface controller may output the audible item representative of the navigation speed in an order indicated by the direction (element 545). Elements 540 and 545 may repeat while user input is available.

Another embodiment is implemented as a program product for implementing systems and methods described with reference to FIGS. 1-5. Embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet adapter cards are just a few of the currently available types of network adapters.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It will be apparent to those skilled in the art having the benefit of this disclosure that the present disclosure contemplates adjustment of temporal acoustical characteristics. It is understood that the form of the embodiments shown and described in the detailed description and the drawings are to be taken merely as examples. It is intended that the following claims be interpreted broadly to embrace all variations of the example embodiments disclosed.

Although the present disclosure and some of its advantages have been described in detail for some embodiments, it should be understood that various changes, substitutions, and alterations can be made herein without departing from the spirit and scope of the disclosure as defined by the appended claims. Although specific embodiments may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for adjustment of temporal acoustical characteristics of words in an item structure, the method comprising:
   receiving the item structure comprising at least a first item, the first item representing a first set of one or more words;
   determining a number of speeds of audio playback for the item structure;
   determining, in response to the number of speeds of audio playback for the item structure, a representation of the item structure for each of the number of speeds of audio playback by determining at least a first abbreviated item for one of the number of speeds comprising:
      extracting one or more keywords or phonemes from the first set to generate a first keyword item;
      abbreviating the keyword item by generating a first alternative representation for the first keyword item to create a first abbreviated item; and
      storing the first abbreviated item;
   wherein abbreviated items for a faster speed are shorter than abbreviated items for a slower speed by extracting less keywords or phonemes from the first set for the faster speed, generating a shorter alternative representation for the faster speed, or both.

2. The method of claim 1, further comprising generating audible items for one or more abbreviated items by rendering the pronunciation of the one or more abbreviated items.

3. The method of claim 1, further comprising receiving via a user interface, an indication of the number of speeds, the number of speeds to represent different speeds with which the user interface may sound the abbreviated items.

4. The method of claim 3, further comprising generating more than one first alternative representations, to create more than one first abbreviated items corresponding to the first keyword item, each of the more than one first abbreviated items to represent a different speed.

5. The method of claim 1, wherein extracting the keywords comprises accessing a text mining knowledge base to determine the keywords based upon word comprehension and grammar data within the text mining knowledge base.

6. The method of claim 1, wherein extracting the one or more keywords comprises accessing a user context and history module to determine the one or more keywords based upon user context and history.

7. The method of claim 6, wherein accessing a user context and history module to determine the one or more keywords based upon user context and history comprises determining the one or more keywords based upon learned user behaviors.

8. An apparatus for adjustment of temporal acoustical characteristics of words in an item structure, the apparatus comprising:
   a device to determine a number of speeds of audio playback for the item structure and to determine, in response to the number of speeds of audio playback for the item structure, a representation of the item structure for each of the number of speeds of audio playback by determining at least a first abbreviated item for one of the number of speeds, the device comprising:
   a keyword extractor to receive the item structure comprising at least a first item, the first item to represent a first set of one or more words, the keyword extractor to extract one or more keywords or phonemes from the first set to generate a first keyword item; and
   an abbreviations generator to abbreviate the keyword item by generating a first alternative representation for the first keyword item to create a first abbreviated item, the abbreviations generator to store the first abbreviated item;
   wherein abbreviated items for a faster speed are shorter than abbreviated items for a slower speed by extracting less keywords or phonemes from the first set for the faster speed, generating a shorter alternative representation for the faster speed, or both.

9. The apparatus of claim 8, further comprising a text mining knowledge base coupled with the keyword extractor to store data related to word comprehension and grammar, wherein the keyword extractor comprises logic to extract the one or more keywords or phonemes based upon the data related to word comprehension and grammar.

10. The apparatus of claim 8, further comprising a user context and history module coupled with the keyword extractor to store data related to user context and history, wherein the keyword extractor comprises logic to extract the keywords or phonemes based upon the data related to user context and history.

11. The apparatus of claim 8, further comprising an audio knowledge base coupled with the abbreviations generator to store data related to pronunciation of the one or more keywords, wherein the abbreviations generator generates altered representations of the one or more keywords or phonemes based upon the data related to pronunciation of the one or more keywords.

12. The apparatus of claim 8, further comprising a text-to-speech generator to generate an audible item for the first abbreviated item by creating an audio rendering of the first abbreviated item in a data storage format.

13. The apparatus of claim 8, further comprising an audible user interface controller, an indication of a number of speeds, the number of speeds to represent different speeds with which the audible user interface controller may sound the first abbreviated item.

14. The apparatus of claim 13, wherein the abbreviations generator comprises logic to receive an indication of the number of speeds, the number of speeds to represent different speeds with which the audible user interface controller may sound the first abbreviated item, and to generate more than one first alternative representations, to create more than one first abbreviated items corresponding to the first keyword item, each of the more than one first abbreviated items to represent a different speed of the number of speeds.

15. A system for adjustment of temporal acoustical characteristics of words in an item structure, the system comprising:
    an audible item structure generator to receive the item structure comprising at least a first item, the first item to represent a first set of one or more words; to determine a number of speeds of audio playback for the item structure; and to determine, in response to the number of speeds of audio playback for the item structure, a representation of the item structure for each of the number of speeds of audio playback by determining at least a first abbreviated item for one of the number of speeds; the audible item structure generator comprising:
        a keyword extractor the keyword extractor to extract one or more keywords or phonemes from the first set to generate a first keyword item; and
        an abbreviations generator to receive an indication of the number of speeds of audio playback to abbreviate the first keyword item to generate a condensed item structure for one or more of the number of speeds by generating a first alternative representation for the first keyword item to create a first abbreviated item based upon the speed;
        wherein abbreviated items for a faster speed are shorter than abbreviated items for a slower speed by extracting less keywords or phonemes from the first set for the faster speed, generating a shorter alternative representation for the faster speed, or both; and
    an audible user interface controller coupled with the audible item structure generator to provide the indication of the number of speeds with which the audible user interface controller may sound the first abbreviated item via a text-to-speech generator.

16. The system of claim 15, further comprising the text-to-speech generator to generate a first audible item for the first abbreviated item to create a pronunciation of the first abbreviated item in a data storage format.

17. The system of claim 16, further comprising a low level audio cache to store the pronunciation of the first abbreviated item in the data storage format.

18. The system of claim 16, wherein the audible user interface controller comprises logic to select the first audible item to present in response to a command from a user and render the first item to an audio output mechanism.

19. The system of claim 15, wherein the abbreviations generator couples with a text-to-speech engine to generate a phonetic version of the first keyword item to identify stress placement within a text-to-speech conversion of the first item, to abbreviate the phonetic version based upon the stress placement to create an abbreviated phonetic version, and to generate a text-to-speech conversion of the abbreviated phonetic version to represent one of the number of speeds.

20. The system of claim 19, wherein the abbreviations generator couples with an audio knowledge base to determine altered phoneme representations of the first keyword item for each speed except the one of the number of speeds to generate the condensed item structure for each speed except the one of the number of speeds.

21. A computer program product for adjustment of temporal acoustical characteristics of words in an item structure, wherein the computer program product does not comprise a transitory signal, the computer program product comprising:
    a computer useable medium having a computer useable program code embodied therewith, the computer useable program code comprising: computer useable program code configured to perform operations, the operations comprising:
        receiving the item structure, the item structure comprising items, wherein each item represents at least one word;
        determining a number of speeds of audio playback for the item structure;
        generating, in response to the number of speeds of audio playback for the item structure, a non-redundant item structure having keyword items based upon the item structure for the number of speeds of audio playback by extracting, from each item, at least one keyword or phoneme to create keyword items;
        determining alternative representations for each keyword item to create a condensed item structure of abbreviated items, the alternative representations each comprising at least one stressed syllable to represent words within each of the keyword items; and
        storing the condensed item structure;
        wherein abbreviated items for a faster speed are shorter than abbreviated items for a slower speed by extracting less keywords or phonemes from the first set for the faster speed, generating a shorter alternative representation for the faster speed, or both.

22. The computer program product of claim 21, wherein the operations further comprise generating audible items for the condensed items by creating pronunciations of the condensed items in a data storage format.

23. The computer program product of claim 21, wherein the operations further comprise receiving via a user interface, an indication of a number of speeds, the number of speeds to represent different speeds with which the user interface may sound each of the condensed items and generating more than one alternative representations for each keyword item, each of the more than one alternative representations for each keyword item to represent a different speed.

24. The computer program product of claim 21, wherein extracting, from each item, at least one keyword comprises accessing a text mining knowledge base to determine the keywords based upon word comprehension and grammar.

25. The computer program product of claim 21, wherein extracting, from each item, at least one keyword comprises accessing a user context and history module to determine the keywords based upon user context and history.

26. The computer program product of claim 25, wherein accessing a user context and history module to determine the keywords based upon user context and history comprises determining the keywords based upon learned user behaviors and learned repetitive words.

* * * * *